United States Patent
Ramos

(10) Patent No.: US 6,286,885 B1
(45) Date of Patent: Sep. 11, 2001

(54) COMBINATION TAILGATE PROTECTOR AND SEAT CUSHION

(76) Inventor: George Joel Wilfred Ramos, 4424 E. Baseline Rd. #1247, Phoenix, AZ (US) 85040

( * ) Notice: Subject to any disclaimer, the term of this patent is extended or adjusted under 35 U.S.C. 154(b) by 0 days.

(21) Appl. No.: 09/663,625

(22) Filed: Sep. 18, 2000

(51) Int. Cl.⁷ .................................................. B62D 25/00
(52) U.S. Cl. ...................... 296/57.1; 296/39.1; 296/39.2; 296/136
(58) Field of Search ................................. 296/57.1, 39.1, 296/39.2, 136; 280/770

(56) References Cited

U.S. PATENT DOCUMENTS

| | | |
|---|---|---|
| D. 323,639 | 2/1992 | Creamer . |
| D. 368,809 | 4/1996 | Fields . |
| 4,707,016 * | 11/1987 | McDonald ........................... 296/39.1 |
| 4,944,612 * | 7/1990 | Abstetar et al. ..................... 296/39.2 |
| 4,997,227 * | 3/1991 | Falzone et al. ...................... 296/39.2 |
| 5,000,503 * | 3/1991 | Bernatek .............................. 296/39.2 |
| 5,104,171 * | 4/1992 | Johnsen et al. ...................... 296/57.1 |
| 5,169,201 * | 12/1992 | Gower .................................. 296/39.2 |
| 5,372,397 * | 12/1994 | Arndt ................................... 296/39.2 |
| 5,695,235 * | 12/1997 | Martindale et al. ................. 296/39.2 |
| 5,722,710 * | 3/1998 | Falciani ................................ 296/39.1 |
| 5,722,711 * | 3/1998 | German ................................ 296/39.2 |
| 5,732,995 * | 3/1998 | Piccariello .......................... 296/57.1 |
| 5,971,464 | 10/1999 | Davis et al. . |
| 5,975,610 * | 11/1999 | Tracy .................................. 296/57.1 |
| 6,017,079 * | 1/2000 | Warner ................................. 296/136 |

* cited by examiner

Primary Examiner—Joseph D. Pape
Assistant Examiner—Kiran B. Patel
(74) Attorney, Agent, or Firm—Jeffrey D. Moy; Jeffrey Weiss; Weiss & Moy, P.C.

(57) ABSTRACT

A combination tailgate cover and seat cushion has a slip cover which covers a front side and a rear side of a tailgate. Cushion material is placed inside the slip cover so that the slip cover has characteristics of a pillow or seat cushion. An attachment device is coupled to the slip cover for attaching the slip cover to the tailgate.

15 Claims, 1 Drawing Sheet

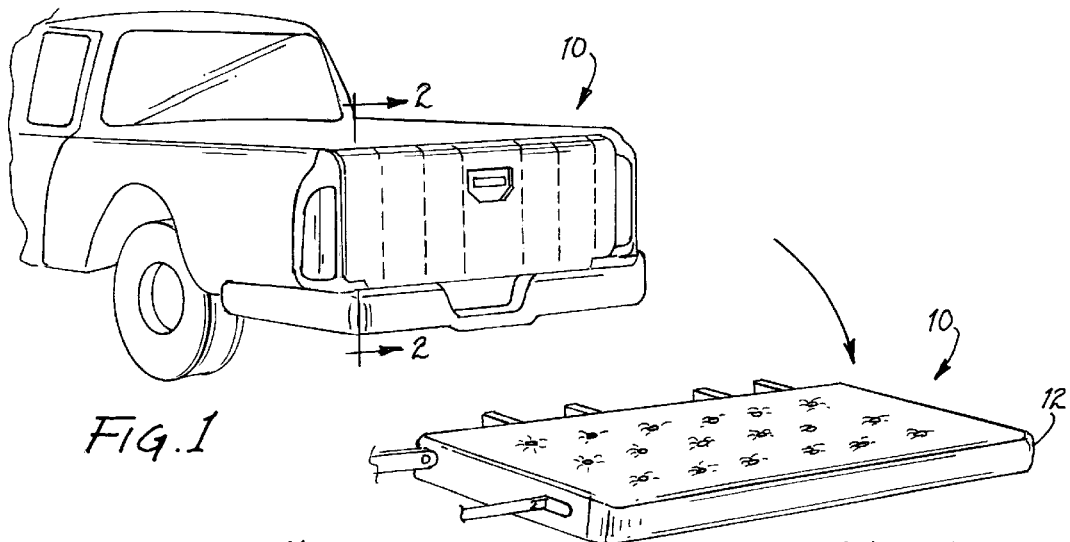
FIG. 1
FIG. 1A
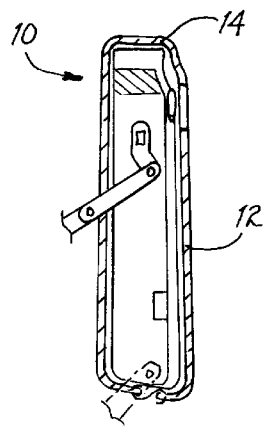
FIG. 2
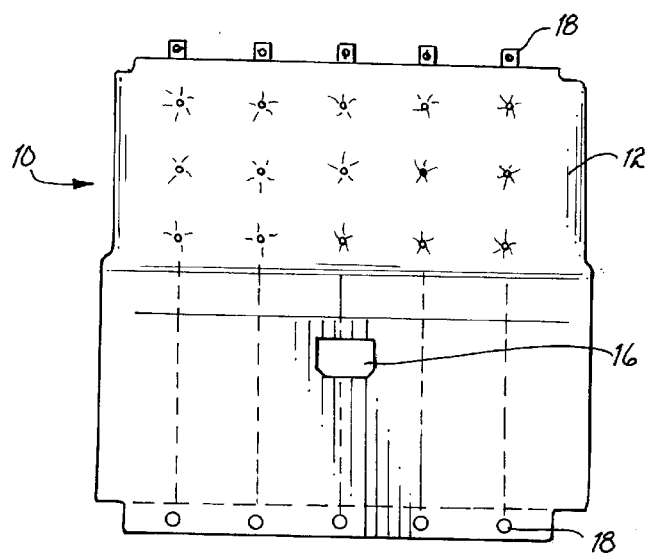
FIG. 3
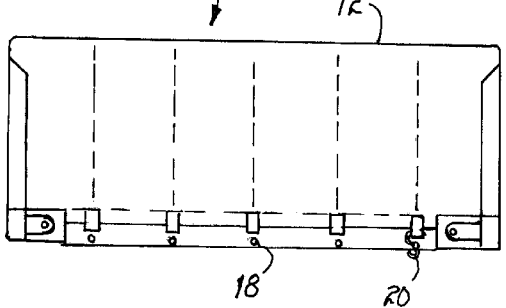
FIG. 4
FIG. 5

COMBINATION TAILGATE PROTECTOR AND SEAT CUSHION

BACKGROUND OF THE INVENTION

1. Field of the Invention

This invention relates to pickup truck accessories and, more specifically, to a cover for a tailgate which is used to protect the tailgate from being damaged and also as a seat cushion when the tailgate is lowered.

2. Description of the Prior Art

In the past, pickup trucks were used mainly for transporting bulky material as well as general purpose hauling. Recently, pickup trucks have become increasingly popular as a means for general purpose transportation. Because of this, more and more pickup truck owners are buying accessories for their trucks.

One popular pickup truck accessory is the bed liner. The bed liner is a preformed plastic liner which is placed in the cargo area of the pickup truck. The bed liner is used to prevent direct contact between the bed of the pickup truck and chemicals, abrasives, and other destructive elements which tend to rust and/or scratch the surface of the pickup truck's bed.

Tailgate covers are often used in conjunction with pickup truck bed liners. Tailgate covers are used to prevent the tailgate of the pickup truck from being scratched whenever cargo is slid into or out of the pickup truck. Tailgate covers are generally preformed and are made out of the same material as the pickup truck bed liner.

Often times, the tailgate of the pickup truck is lowered (i.e., horizontal position) to form a makeshift seat. Many times people like to sit on the tailgate while fishing along a riverbank or while at an outdoor event like a drive-in movie or a soccer game at the local park. The problem is that the tailgate is hard and not very comfortable. Furthermore, present tailgate covers are also very uncomfortable as these are made out of preformed plastic and have no cushion affect to them.

Therefore, a need existed to provide an improved tailgate cover. The improved tailgate cover would allow a person to comfortably sit on the tailgate for extended periods of time.

SUMMARY OF THE INVENTION

In accordance with one embodiment of the present invention, it is an object of the present invention to provide an improved tailgate cover.

It is another object of the present invention to provide an improved tailgate cover that would allow a person to comfortably sit on the tailgate for extended periods of time.

BRIEF DESCRIPTION OF THE PREFERRED EMBODIMENTS

In accordance with one embodiment of the present invention a combination tailgate cover and seat cushion is disclosed. The combination tailgate cover and seat cushion has a slip cover which covers a front side and a rear side of a tailgate. Cushion material is placed inside the slip cover so that the slip cover has characteristics of a pillow or seat cushion. An attachment device is coupled to the slip cover for attaching the slip cover to the tailgate.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

FIG. 1 is an elevated perspective view of the combination tailgate cover and seat cushion of the present invention installed on a tailgate of a pickup truck with the tailgate in a closed position.

FIG. 1A is an elevated perspective view of the combination tailgate cover and seat cushion of FIG. 1 with the tailgate in an opened position.

FIG. 2 is a cross-sectional side view of the combination tailgate cover and seat cushion of FIG. 1 taken along lines 2—2.

FIG. 3 is a top view of the combination tailgate cover and seat cushion uninstalled.

FIG. 4 is a back end view of the combination tailgate cover and seat cushion of FIG. 1 looking from inside the cargo area of the pickup truck.

FIG. 5 is an elevated perspective view of one embodiment of a fastener used with the combination tailgate cover and seat cushion of FIG. 1.

DETAILED DESCRIPTION OF THE PREFERRED EMBODIMENT

Referring to FIGS. 1–4 wherein like numerals and symbols represent like elements, the combination tailgate cover and seat cover 10 (hereinafter cover 10) is shown. The cover 10 has an outer slipcover 12. The outer slipcover 12 is made out of a durable water and weather resistant material. However, the material of the outer slipcover 12 must not be hard and uncomfortable like current preformed plastic tailgate covers. Thus, the outer slipcover 12 should be made out of a durable water and weather resistant material that is fairly soft like vinyl, nylon, canvas, naughide, and the like. Other material like cloth could be used if the material is treated to be weatherproof. It should be noted that these are only examples and should not be seen as to limit the scope of the present invention.

The outer slipcover 12 is made out of a first sheet of material which is coupled to a second sheet of material. The two pieces of material may be sown together or may be removably coupled together by a zipper mechanism or the like. When the two pieces of material are coupled together, an internal void area 14 is formed between the two pieces of material. The void area 14 is filled with a soft cushion material. By filling the void area 14, the cover 10 has characteristics similar to a seat cushion or pillow. The soft cushion material will allow a person to comfortably sit on the tailgate when the cover 10 is installed on the tailgate of the pickup truck. The soft cushion material may be a foam, cotton fibers, or the like. If the outer slipcover 12 is made and sealed to be air tight, air may be used to fill the void area 14. It should be noted that these are only examples of what could be placed in the void area 14 and should not be seen as to limit the scope of the present invention.

The outer slip cover 12 is preformed to fit the specific size of a tailgate assembly for a pickup truck. The outer slip cover 12 could be sized to fit over a tailgate assembly with or without a present tailgate cover. On the front end of the outer slip cover 12 is an opening 16. The opening 16 is cut completely through the outer slip cover 12. The opening 16 is cut to allow access to a tailgate release handle. The tailgate release handle is used to unlock and lower the tailgate as well as to lock the tailgate in the closed position.

Once the outer slip cover 12 is place over the tailgate assembly, one end of the outer slip cover 12 is coupled to another end of the outer slip cover 12 to hold the cover 10 on the tailgate assembly. A fastener device 18 is used to coupled the two ends of the outer slip cover 12 together. The fastener device 18 may be any type of device which will couple and hold the two ends of the outer slip cover 12 together. For example, hook and loop material could be place on opposite ends of the outer slip cover 12. A button type fastener or male/female connectors could also be placed on each end of the outer slip cover 12. It should be noted that these are only examples of the type of fasteners that could be used and should not be seen as to limit the scope of the application.

In one embodiment of the present invention, the fastener device 18 has a plurality of openings. A predetermined number of openings are cut through one end of the outer slip cover 12. An equal number of corresponding openings are cut through the second end of the outer slip cover 12. When the outer slip cover 12 is place over the tailgate assembly, the openings will be in relative alignment with one another. An "S" hook 20 (FIG. 5) is then placed through the opening and the corresponding opening to hold both ends of the outer slip cover 12 together.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A combination tailgate cover and seat cushion comprising, in combination:
    a slip cover which covers a front side and a rear side of a tailgate;
    cushion material which is placed inside the slip cover; and
    an attachment device coupled to the slip cover for attaching the slip cover to the tailgate.

2. A combination tailgate cover and seat cushion in accordance with claim 1 wherein the slip cover comprises:
    a first sheet of material; and
    a second sheet of material coupled to the first sheet of material wherein a void area is created between the first sheet and the second sheet, the void are being where the cushion material is placed.

3. A combination tailgate cover and seat cushion in accordance with claim 2 wherein the first sheet and second sheet are made out of a soft, durable, water and weather resistant material.

4. A combination tailgate cover and seat cushion in accordance with claim 3 wherein the first sheet and the second sheet are made out of one of vinyl, nylon, canvas, and naughide.

5. A combination tailgate cover and seat cushion in accordance with claim 1 wherein the cushion material is a foam material.

6. A combination tailgate cover and seat cushion in accordance with claim 1 wherein the cushion material is a cotton fiber.

7. A combination tailgate cover and seat cushion in accordance with claim 1 wherein the attachment device comprises:
    a first set of openings cut through a top side of the slip cover;
    a second set of complementary openings cut through a bottom side of the slip cover; and
    a set of connectors which go through the first set of opening and the second set of complementary openings which hold the slip cover to the tailgate.

8. A combination tailgate cover and seat cushion in accordance with claim 7 wherein the set of connectors are "S" hooks.

9. A combination tailgate cover and seat cushion in accordance with claim 1 further comprising a cut out in a front section of the slip cover which is used for a tailgate hatch of a pickup truck to be exposed.

10. A combination tailgate cover and seat cushion comprising, in combination:
    a slip cover made of a soft, durable, water and weather resistant material which covers a front side and a rear side of a tailgate and having a cut out in a front section of the slip cover which is used for a tailgate hatch of a pickup truck to be exposed, the slip cover comprising:
        a first sheet of material; and
        a second sheet of material coupled to the first sheet of material wherein a void area is created between the first sheet and the second sheet, the void are being where the cushion material is placed;
    cushion material which is placed inside the void area in the slip cover; and
    an attachment device coupled to the slip cover for attaching the slip cover to the tailgate.

11. A combination tailgate cover and seat cushion in accordance with claim 10 wherein the first sheet and the second sheet are made out of one of vinyl, nylon, canvas, and naughide.

12. A combination tailgate cover and seat cushion in accordance with claim 10 wherein the cushion material is a foam material.

13. A combination tailgate cover and seat cushion in accordance with claim 10 wherein the cushion material is a cotton fiber.

14. A combination tailgate cover and seat cushion in accordance with claim 10 wherein the attachment device comprises:
    a first set of openings cut through a top side of the slip cover;
    a second set of complementary openings cut through a bottom side of the slip cover; and
    a set of connectors which go through the first set of opening and the second set of complementary openings which hold the slip cover to the tailgate.

15. A combination tailgate cover and seat cushion in accordance with claim 14 wherein the set of connectors are "S" hooks.

* * * * *